C. A. HOYT.
CAMERA EXPOSURE INDICATOR AND SHUTTER LOCK.
APPLICATION FILED MAR. 29, 1915. RENEWED JAN. 29, 1917.

1,224,300.

Patented May 1, 1917.

Inventor
Clarence A. Hoyt

Witnesses
Clare Moffitt
W. S. Wing

By
P. A. Elliott
Attorney

C. A. HOYT.
CAMERA EXPOSURE INDICATOR AND SHUTTER LOCK.
APPLICATION FILED MAR. 29, 1915. RENEWED JAN. 29, 1917.

1,224,300.

Patented May 1, 1917.
4 SHEETS—SHEET 2.

Witnesses
Clare Moffitt
W. H. Wing

Inventor
Clarence A. Hoyt
By R. V. Elliott
Attorney

C. A. HOYT.
CAMERA EXPOSURE INDICATOR AND SHUTTER LOCK.
APPLICATION FILED MAR. 29, 1915. RENEWED JAN. 29, 1917.

1,224,300. Patented May 1, 1917.
4 SHEETS—SHEET 3.

Witnesses
Clare Moffitt
W. H. Wing

Inventor
Clarence A. Hoyt
By P. L. Elliott
Attorney

C. A. HOYT.
CAMERA EXPOSURE INDICATOR AND SHUTTER LOCK.
APPLICATION FILED MAR. 29, 1915. RENEWED JAN. 29, 1917.

1,224,300.

Patented May 1, 1917.
4 SHEETS—SHEET 4.

Witnesses
Clare Moffitt.
W. S. Wing

Inventor
Clarence A. Hoyt
By
R. J. Elliott
Attorney

UNITED STATES PATENT OFFICE.

CLARENCE A. HOYT, OF TACOMA, WASHINGTON.

CAMERA EXPOSURE-INDICATOR AND SHUTTER-LOCK.

1,224,300. Specification of Letters Patent. Patented May 1, 1917.

Application filed March 29, 1915, Serial No. 17,646. Renewed January 29, 1917. Serial No. 145,313.

*To all whom it may concern:*

Be it known that I, CLARENCE A. HOYT, a citizen of the United States, residing at Tacoma, in the county of Pierce, State of Washington, have invented a certain new and useful Camera Exposure-Indicator and Shutter-Lock, of which the following is a specification.

This invention relates to cameras and especially to that class in which the photograph is taken on a continuous strip of sensitized substance known as a film, and in which the said film is wound from one spool to the other, the successive windings being made between exposures through the lens of the camera.

The object of this invention is to prevent the double exposure of any portion of the film and this object is accomplished by automatically locking the lens shutter as soon as an exposure has been made. Further objects are to automatically unlock the shutter when the film is wound on the receiving spool so as to remove the exposed portion and bring a new portion into position to be exposed; to automatically indicate to the operator at all times whether the portion of the film in such position has been exposed or not; and to provide simple, cheap, and effective mechanism whereby the above objects may be accomplished.

I attain these and other objects by the devices, mechanisms and arrangements illustrated in the accompanying drawings, in which—

Figure 1:
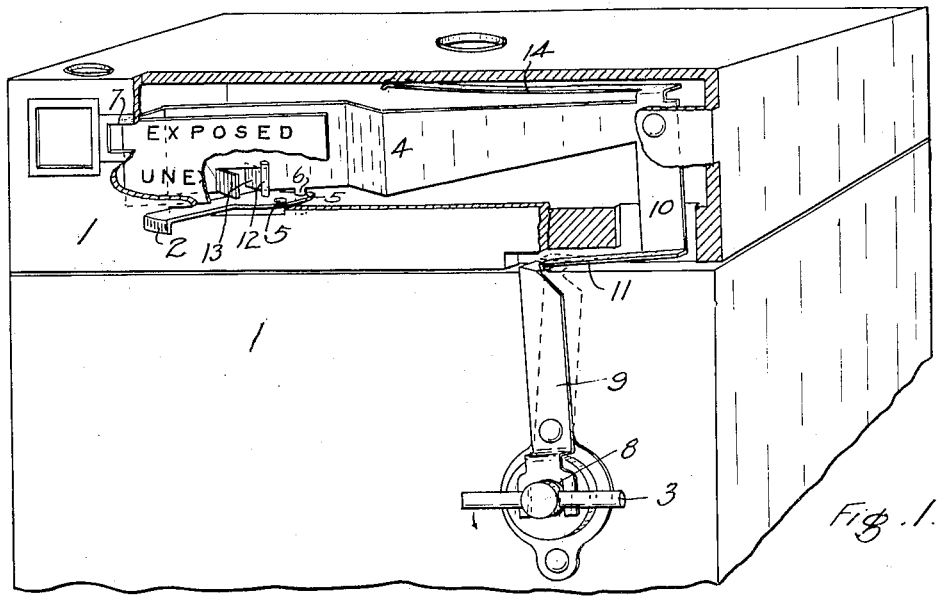
Figure 2:
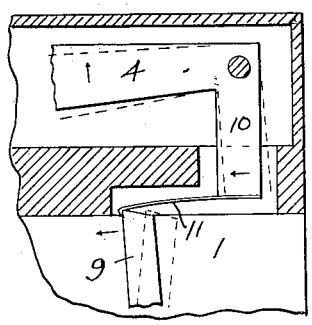
Figure 3:
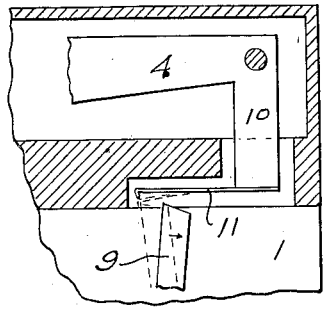
Figure 4:
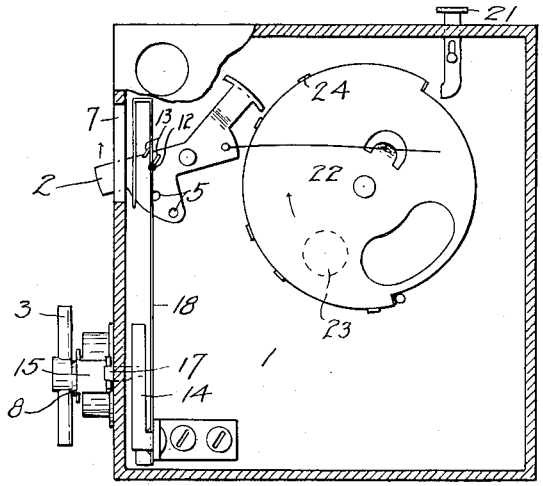
Figure 5:
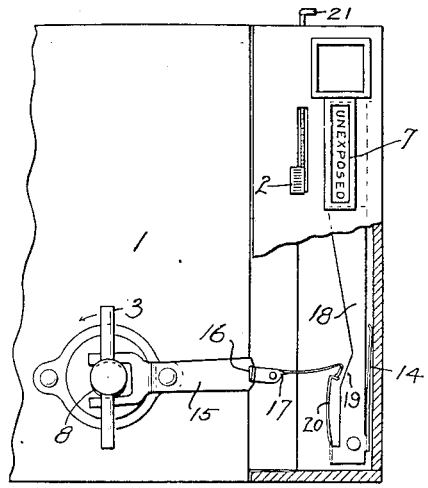
Figure 6:
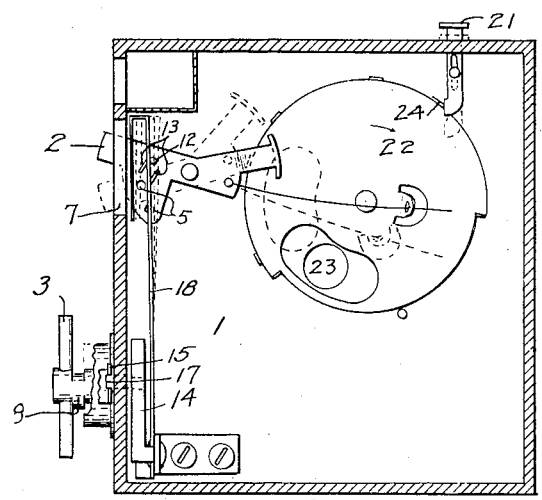
Figure 7:
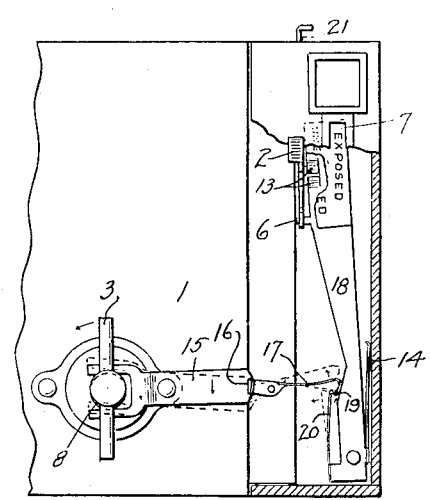
Figure 8:
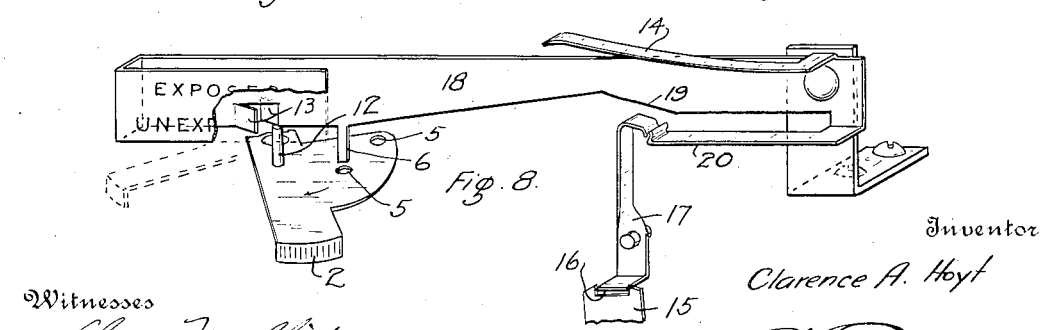
Figure 9:
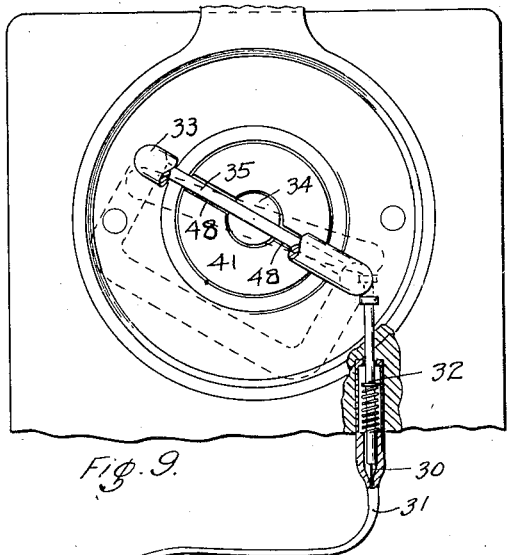
Figure 10:
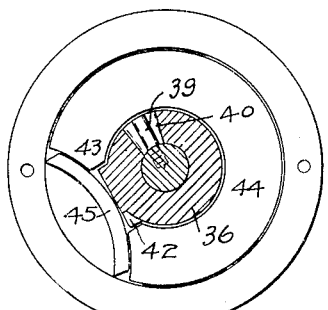
Figure 11:
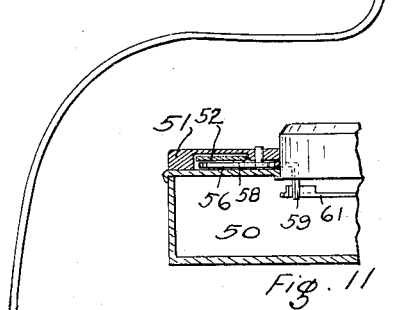
Figure 12:
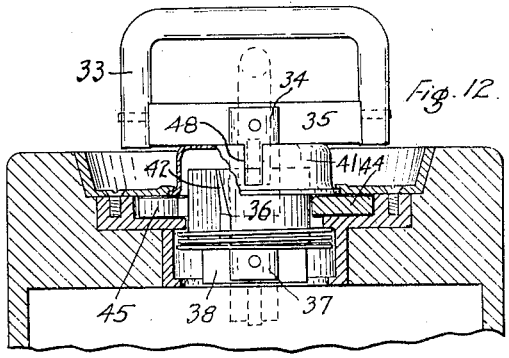
Figures 13, 14:
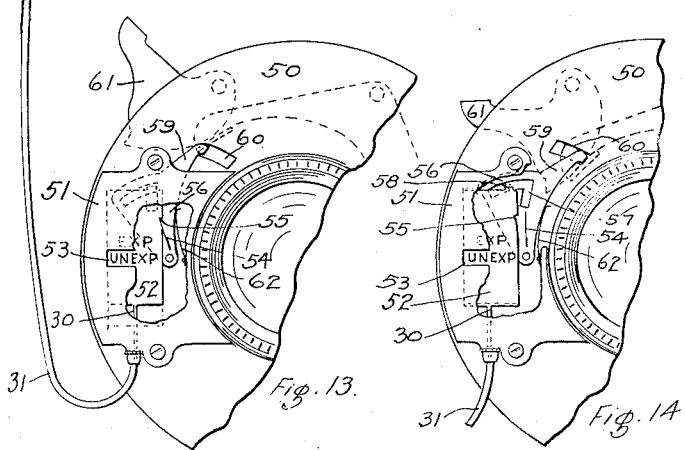
Figure 15:
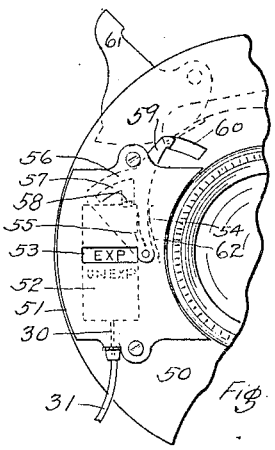
Figure 16:
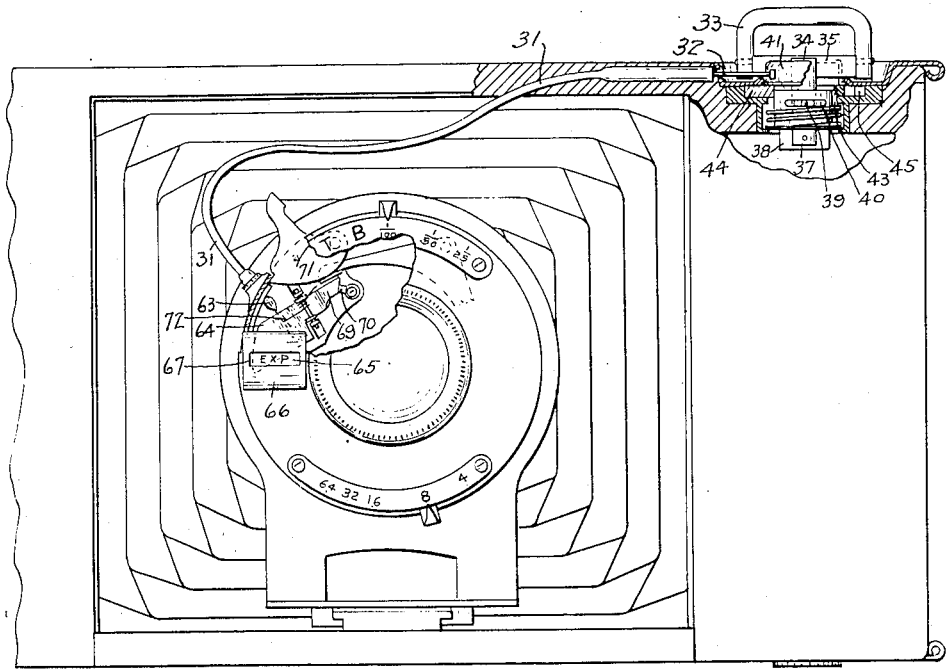
Figure 17:
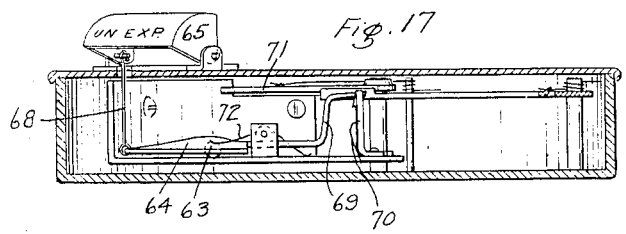
Figure 18:
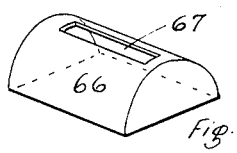
Figure 19:
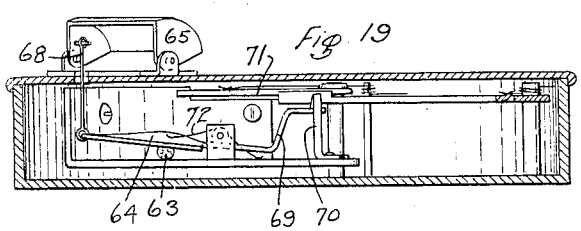
Figure 20:
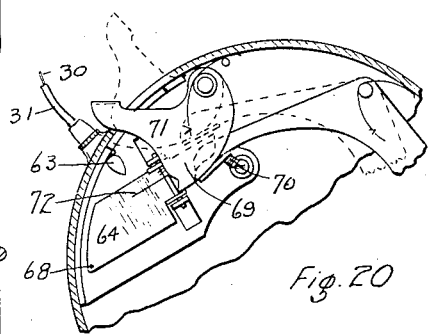

Figure 1 is a perspective view of a portion of a box camera equipped with the simplest form of my device, a portion of the side of the box being broken away to reveal the interior mechanism which is shown in the position in which it locks the shutter mechanism; Figs. 2 and 3 are side views of the unlocking mechanism showing the parts in the positions in which they lie when the unlocking has just been accomplished and subsequent thereto, respectively; Figs. 4 to 8, inclusive, illustrate another form of mechanism for a box camera; Figs. 4 and 5 are front and side views, respectively, showing the parts in unlocked position; Figs. 6 and 7 are similar views, showing them at the moment that exposure is made and the exposing lever is locked; and Fig. 8 is a perspective view of the locking mechanism, showing the parts in unlocked position; Figs. 9 to 20 inclusive, illustrate two forms of the mechanism as adapted to folding or bellows cameras; Fig. 9 is a plan of the film-winding mechanism of a bellows camera, and of the means operated thereby whereby the shutter unlocking mechanism in Fig. 13 is actuated; Fig. 10 is a plan, partly in section, of the friction clutch of said film-winding mechanism; Figs. 11, 13, 14 and 15 show another form of my device; Fig. 11 is a section of a portion of the shutter box with my mechanism mounted thereon; Fig. 12 is a section of the film-winding mechanism showing the handle raised to allow the insertion of a new film roller; Figs. 13, 14 and 15 are elevations of a portion of the lens and shutter box, with portions broken away to show the mechanism therein, the parts being in the unlocked, exposing, and locked positions respectively; Fig. 16 to 20, inclusive, show another form of my device; Fig. 16 is a front elevation of a bellows camera equipped with my device, showing the film-winding mechanism in section, and a part of the shutter box broken away; Figs. 17 and 19 are sections of the shutter box showing my mechanism therein, the parts being in locked and unlocked positions respectively; Fig. 18 is a perspective view of the exposure indicator cover; and Fig. 20 is a plan of my mechanism showing the parts in their positions when the film is being exposed and the shutter is locked against further exposure.

Similar numerals of reference refer to similar parts throughout the several views.

Referring first to the form of my invention illustrated in Figs. 1, 2 and 3: The box 1 of the camera is of the usual form for such machines and is provided with an actuating lever 2 pivoted within the box in the usual way, said lever having shutter actuating means secured thereon as illlustrated more fully in Figs. 4 and 6. The film is wound on to a spool in connection with the winding nut or handle 3. A long lever 4 is pivoted within the box, said lever carrying locking devices engaging the shutter lever 2 to lock it when it has been moved into position at which the shutter is actuated, and also a device adapted to be engaged by a second lever actuated by said film-winding handle 3 when it is turned to wind the film to remove the lever 4 from locking said shutter lever 2. The shutter lever 2 has two holes 5 through its surface in such relative positions as to occupy the same position relatively to the box when the lever 2 is in its two extreme positions. The lever 4 carries a pin 6 adapted to pass through either of said holes to lock the lever 2 in such position. An extension of the lever 4 has the legends "Exposed" and "Unexposed" imprinted thereon in such positions that the legend "Exposed" will be visible through a small opening 7 in the side of the box 1 when the said pin 6 is locking the lever 2 and so that when the lever 4 is raised to withdraw said pin 6 from either of the holes 5 the legend "Unexposed" is similarly visible through the same opening 7. An eccentric cam 8 is formed on the stem of the film-winder 3 (see also Fig. 6). A lever 9 is pivoted to the box adjacent to the winder 3 and has a forked end engaging the cam 8. The other end of the lever 9 turns inward through a suitable slot in the side of the box and is formed on a bevel as shown in the drawings. A side extension 10 of the lever 4 carries a spring hook 11 which is positioned so as to be engaged by the said inturned end of the lever 9 when the pin 6 of the lever 4 is locking the shutter lever 2. A pin 12 is mounted on the shutter lever 2 and extends upward adjacent the lever 4. A pair of ears 13 are cut and bent from the lower edge of the lever 4, in opposite directions, adjacent the two positions of said pin 12 when the shutter lever 2 is in its two extreme positions. The lever 4 is made of spring material and when the pin 12 is in one position it slightly springs the lever 4 in one direction while when it is in the other position it springs it the other way. A spring 14 always tends to force the lever 4 downward into the locking position.

The operation of the above mechanism is briefly described as follows:—Suppose that a new portion of film is in position for exposing, then the parts 4, 9, 10 and 11 occupy the positions shown in Fig. 3, and the outer end of the lever 4 is supported on the end of the pin 12 which is directly under one of the ears 13, and in this position the word "Unexposed" is visible through the opening 7. Then when the picture is to be taken, the shutter lever 2 is turned on its pivot, thus withdrawing the pin 12 from under the ear 13 and causing the lever 4 to lower slightly until the end of the pin 6 rests on the shutter lever 2, the said lever 2 having moved sufficiently far to prevent the pin 6 from immediately entering the adjacent hole 5. Further motion of the shutter lever 2 takes the picture on the exposed film and as soon as the said lever 2 has reached the end of its travel, the said pin 6 enters the adjacent hole 5 and locks the shutter lever 2 from further motion in either direction, thus making it impossible to again expose the same portion of film. In this position the lever 4 is in the position shown in Fig. 1, the word "Exposed" is visible, and the spring hook 11 is pointed downward. Then the film-winder 3 is turned to wind the exposed portion of the film on the spool connected therewith and to bring a new unexposed portion thereof into position for exposure. As soon as the winder 3 is thus turned the lever 9 is oscillated and the pointed end thereof engages the hook on the spring hook 11. If this pointed end happens to be moving to the right at first, it will bend the spring 11 out of the way and then, when it makes its return motion it engages the hook and draws it and the side extension 10 toward the left, thus raising the lever 4 and drawing the pin 6 out of the hole 5. The end of the lever 4 is thus raised enough to pass over the pin 12 so that when the lever is lowered again it rests on the end of the pin 12, the ear 13 having sprung back from its distorted position to lie directly over the said pin 12. Now the film-winder is continued to be turned until the exposed portion of the film is entirely wound on the spool and a new portion is in position, and the word "Unexposed" is now visible through the opening 7.

Referring now to the form shown in Figs. 4 to 8, inclusive. This form is very similar to the above described form, differing therefrom in the unlocking mechanism. The camera is illustrated as being set to take a "time" exposure. The box 1, shutter lever 2, and film-winder 3 are the same as above described. The cam 8 on the film-winder 3 operates a pivoted lever 15, corresponding with the above mentioned lever 9, but differing therefrom in that it does not bend into a slot in the box, but has a notch 16 formed in its end. An intermediate spring lever 17 is pivoted in the box and has its end turned out to engage the said notch in the lever 15. The other end of this lever is bent to form a beveled surface with a downturned or hooked end. The long lever 18 is similar in all respects to the corresponding lever 4, except that immediately over the beveled end of the lever 17 it is cut to form a correspondingly inclined edge, as at 19. The end of the spring lever 17 is adapted to engage the end of the spring hook 20 which corresponds with the part 11 above described. In order to take a "time" exposure with this device it is necessary to set the camera therefor by pulling out the catch 21 in the usual way so that the shutter 22 will swing only far enough in its travel, under the action of the lever 2, to uncover the lens 23, said catch engaging a tooth 24 on the shutter 22, because the lever 2 becomes locked at the end of its travel and therefore cannot make the return motion as is usual in such cameras. In order then to stop the exposure, the catch 21 is pushed in, thus releasing the tooth 24 and allowing the shutter 22 to conclude its motion under the action of the force stored in the usual spring connection between the lever 2 and the shutter 22.

The above form of my invention locks the shutter in exactly the same way as the first described form, and in this position the lever 18 is down so that the inclined edge 19 thereof lies immediately in the line of travel of the beveled end of the intermediate lever 17 (Fig. 7) so that when it is first operated toward the right, the lever 18 is raised to unlock the lever 2 in the same way as the above described lever 4. Now, as the film is further wound, the lever 17 is oscillated and engages the hooked end of the spring 20 (Fig. 5) and the two springs act on each other so that the beveled end of the spring lever 17 is strained back from its above mentioned unlocking position. If the film is left in this position then the two springs remain strained (Fig. 5) and as soon as the picture is taken the lever 18 falls into the locking position (Fig. 7) because the said lever 17 is sprung back out of the way of the inclined edge 19. The reaction between the two springs 17 and 20 aids the action of the spring 14.

Referring now to the two forms shown in Figs. 9 to 20, inclusive, and especially to the unlocking means illustrated in Figs. 9, 10, 12 and 16. These forms are adapted for use in folding or bellows cameras. The locking means is located adjacent to or in the shutter box and is unlocked by means of a flexible connection operated by the film-winder. This flexible connection may consist of any of the well known means for attaining such a purpose, such as a pneumatic tube or, as illustrated, a wire 30 is suitably inclosed in a tube 31 and transmits any longitudinal motion of one end to the other end. A spring-resisted pusher 32 is secured to its actuating end and is suitably mounted adjacent to the film-winder so as to be engaged thereby when the winder is turned (Figs. 9 and 16). Now it is necessary that the said pusher be allowed to travel back to its initial position as soon as the film has been exposed and the shutter locked, as hereinafter described, and, in case the said film-winder has been left in contact with the pusher, it is therefore necessary that the film-winder be permitted to move backward through a small angle without turning the film backward. In order to allow for this I make the film-winder in the following manner: The handle 33 is mounted on a short shank 34 and has a cross-bar 35. The shank 34 fits in a socket 36 which ends in a shank 37 on which the spool-engaging key 38 is mounted. A pin 39 is secured in the shank 34 and fits in a horizontal slot 40 in the socket 36. A holder 41 is rotatably mounted on the camera concentric with the film-winder, said holder having a cross-slot 42 therein into which the cross-bar 35 fits when the handle is lowered to engage the spool (Fig. 16). When the handle 33 is raised to remove or insert a spool the cross-bar 35 rests on top of the holder 41. The outer surface of the socket 36 is provided with a clutch operating mechanism (Figs. 10 and 12) which is similar to that usually employed but which has an additional inclined shoulder 42 oppositely arranged from the usual shoulder 43. The shoulders 42 and 43 rest within the surrounding clamp ring 44 and against the small segment 45. This arrangement allows the handle to turn freely when it is pulled up so that the cross-bar 35 rests on the holder 41, because the broad lower portion of the shoulder 42 engages the ring 44 before it clamps and therefore the ring turns freely with the handle in either direction; but when the handle is down in its normal or operative position the narrow upper part of the shoulder 42 is in line with the ring and therefore the ring clamps in the usual way to prevent the socket from turning backward. The handle 33 can, however, turn backward through a small angle because the pin 39 can move backward in the slot 40. Thus the pusher 32 may force the handle backward when the film has been exposed, to enable the shutter-locking mechanism to operate without turning the film backward.

Referring now more particularly to the form of shutter lock illustrated in Figs. 11, 13, 14 and 15: This form is particularly applicable when the shutter mechanism leaves but little room within the shutter box 50 and, in this case, my mechanism is mounted within a very small receptacle 51 on the outer face of the shutter box. The actuated wire 30 passes into the receptacle 51 and has a flat plate 52 secured on its end, said plate having legends "Exposed" and "Unexposed" thereon, either of which is adapted to be visible through an opening 53 in the receptacle 51. The plate 52 is confined by suitable guiding means, to a longitudinal movement in line with the movement of the end of the wire 30 to which it is attached. A small spring 54 is mounted adjacent to the side of the plate 52, as hereinafter described, and is adapted to enter a notch 55 in the side of the plate 52 when it is in the unlocked "unexposed" position, shown in Fig. 13, to hold said plate in that position until the shutter operating mechanism is actuated to expose the film. A plate 56 is pivoted within the receptacle 51, immediately below the sliding plate 52, and said plate 56 has a slot 57 therein, said slot being partially curved on a circular arc about the pivot of the plate and partially substantially radial inward from said circular portion. A small lug 58 formed on the end of said sliding part 52 enters the slot 57 in the plate 56. The spring 54 is secured to the plate 56. The plate 56 has an extension 59 which passes out of the receptacle 51 and is bent to enter the shutter box through a small slot 60 therein and engages the end of the shutter-operating lever 61 therein on its operating side, so that if said bent part of the extension 59 is locked against motion, then the said shutter lever 61 cannot move, and so that when said shutter lever 61 is actuated, it causes the pivoted plate 56 to turn on its pivot and the lug 58 to relatively move within the circular portion of the slot 57. The parts are so arranged and positioned that when the film is unexposed (Fig. 13) the spring 54 engages the notch 55 in the plate 52 and the lug 58 engages the arc part of the slot 57. As soon, however, as the operating shutter lever 61 is actuated it causes the plate 56 to swing on its pivot and carries the spring 54 away from engagement with the notch 55 (Fig. 14), thus causing the lug 58 to bear on the inner or lower portion of the circular part of the slot 57 and bringing the notch 55 below the line of the end of the spring 54. Then when the lever 61 is released, the plate 56 swings back to its normal position, under the action of the spring 62, thus bringing the lug 58 in line with the straight or radial part of the slot 57 so that the plate 52 will now be free to slide downward, under the influence of the spring in the pusher, and to cause the legend "Exposed" to be visible (Fig. 15). Now it is evident that, as the lug 58 is in the end of this straight part of the slot, the plate 56 cannot turn on its pivot and is locked by said lug, and also that the lever 61 cannot be operated because it is held by the part 59 of the plate 56. When the film-winder is operated, the pusher 32 actuates the wire 30 thus raising the plate 52 until the spring 54 engages the notch 55, when the legend "Unexposed" is visible and the lever 61 is free to move as before.

Referring now to the form illustrated in Figs. 16 to 20, inclusive:—This form may be used when there is considerable room in the shutter box. In this case the wire in the tube 31 has a head 63 formed on its end. A plate 64 is pivoted within the box so as to have an upward or outward movement, and said plate has an inclined lower side adjacent to the head 63 of the wire. The head 63 of the wire is adapted to enter under the said plate 64 and to engage the said inclined portion thereof and thus turn the plate on its pivots. A small swinging indicator 65 is pivoted outside of the shutter box within a cover 66, having an opening 67 therein, said indicator being adapted to be swung on its pivot by the movement of the plate 64, being connected thereto by a wire 68. The indicator 65 has the legends "Exposed" and "Unexposed" thereon in such positions that either one thereof may be visible through the opening 67 in the cover 66. The other end 69 of the plate 64 is adapted to catch under the spring latch 70 when the part 64 is raised by the head 63 as above described. The part 69 of the plate 64 is adapted to lie beside the shutter lever 71 when the head 63 is withdrawn from under the plate 64 and the part 69 is not engaged by the catch 70, thus preventing the said shutter lever 71 from being moved. The spring 72 engages the part 64 to keep it down when the head 63 is removed. Before the portion of the film has been exposed, the parts lie as in Figs. 19 and 20; the inclined part 64 is raised, the other end 69 thereof is depressed out of the way of the lever 71 and is held in this depressed position by means of the spring latch 70. Then when the lever 71 is operated to actuate the shutter, it passes over the part 69 and pushes the spring latch 70 from off the end 69. The end 69 now engages the under side of the lever 71 and so it cannot return to its normal or locking position until the lever 71 is returned to its normal position on the completion of the exposure. Then the end 69 springs up under the action of the spring 72 and engages the side of the lever 71 to lock it and the swinging indicator is turned so that the word "Exposed" is visible. Then when the film-winder is turned, the head 63 is inserted under the part 64 and raises it, thus lowering the part 69 to engage under the spring catch 70 and turning the indicator so that the word "Unexposed" is visible.

Having described my invention, what I claim is:—

1. In a photographic camera, having a film-changing mechanism and a shutter-operating mechanism; the combination of a spring actuated stop; means engaging said spring-actuated stop to hold it in inoperative position; means formed on the shutter-operating mechanism and adapted to engage said stop to release it from said holding means when said shutter-operating mechanism is actuated, whereby the stop engages and locks the shutter-operating mechanism from further motion when it has completed the exposure; and means actuated by the film-changing mechanism and engaging the spring-actuated stop to remove it from said locking position and to bring it into engagement with said holding means.

2. In a photographic camera, having a film-changing mechanism and a shutter-operating mechanism; the combination of a spring-actuated stop; means engaging said spring-actuated stop to hold it in inoperative position; means formed on the shutter-operating mechanism and adapted to engage said stop to release it from said holding means when said shutter-operating mechanism is actuated, whereby the stop engages and locks the shutter-operating mechanism; means controlled by the shutter-operating mechanism and engaging the locking means whereby the locking action thereof is delayed until the motion of the shutter-operating mechanism is completed; and means actuated by the film-changing mechanism and engaging the spring-actuated stop to remove it from said locking position and to bring it into engagement with the holding means.

3. In a photographic camera, having a shutter-operating mechanism; the combination with automatic means engaging the shutter-operating mechanism whereby said mechanism is locked against further operation as soon as it has been actuated; means engaging said shutter-locking mechanism whereby the locking mechanism is disengaged from the shutter-operating mechanism; and means connected with said locking means and adapted to indicate whether the shutter-operating mechanism is locked or unlocked.

4. In a photographic camera, having a film-changing mechanism and a shutter-operating mechanism, the combination with automatic means engaging the shutter-operating mechanism whereby said mechanism is locked against further operation as soon as it has been actuated; means adapted to unlock said locking mechanism; and flexible means actuated by the film-changing mechanism and actuating said unlocking means.

CLARENCE A. HOYT.

Witnesses:
R. V. Hoyt,
John M. Arntson.